Figure 1:
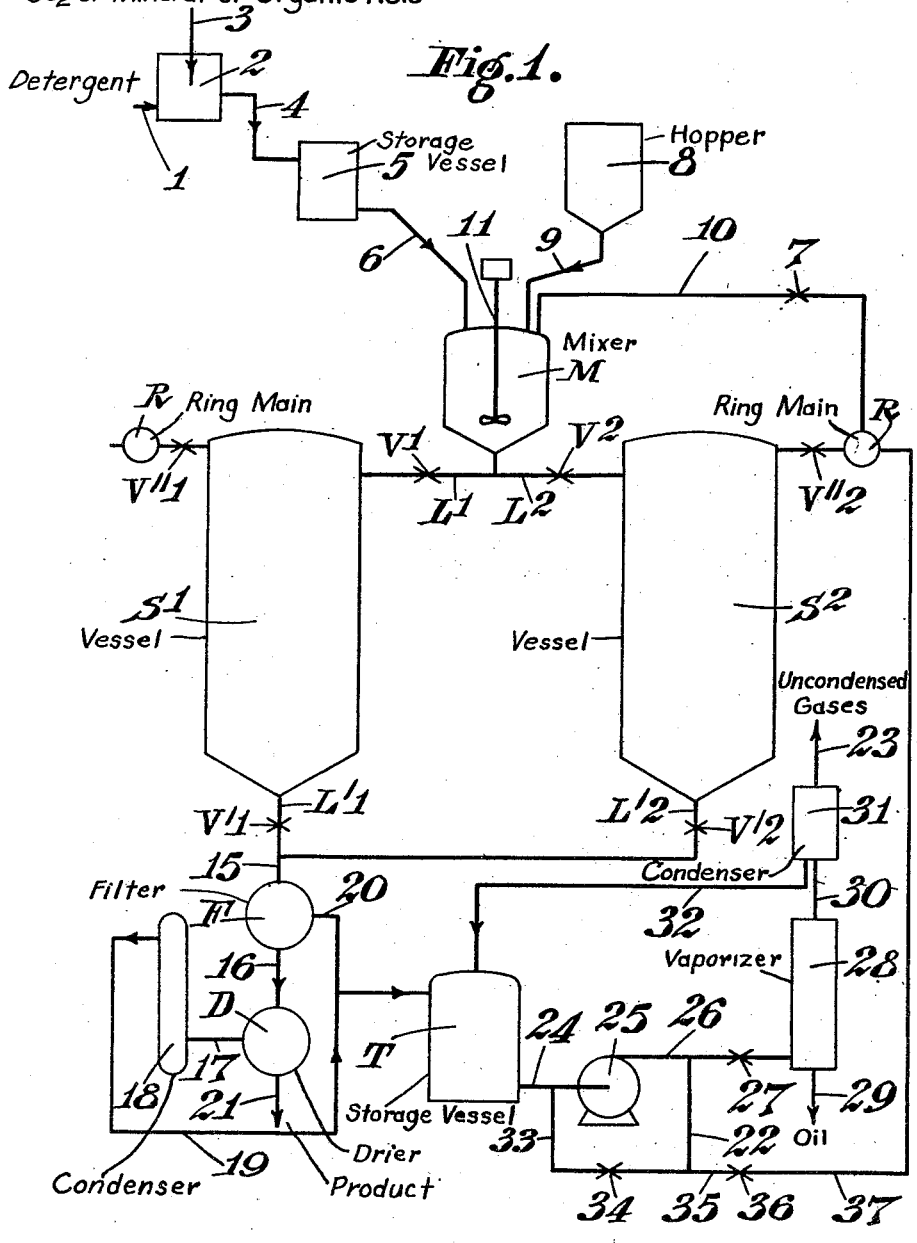

Nov. 26, 1957 D. H. DESTY ET AL 2,814,611
PRODUCTION OF SOLID NON-IONIC SURFACE ACTIVE AGENTS
Filed Nov. 12, 1953 2 Sheets-Sheet 2

INVENTORS:
DENNIS HENRY DESTY
CHARLES LESLIE ARTHUR HARBOURN
BY
ATTORNEYS

United States Patent Office 2,814,611
Patented Nov. 26, 1957

2,814,611

PRODUCTION OF SOLID NON-IONIC SURFACE ACTIVE AGENTS

Dennis Henry Desty and Charles Leslie Arthur Harbourn, Sunbury-on-Thames, England, assignors to The British Petroleum Company Limited Application November 12, 1953, Serial No. 391,702

Claims priority, application Great Britain December 31, 1952

10 Claims. (Cl. 260—96.5)

This invention relates to a process for the production of non-ionic surface active agents in solid form.

It is a well-known disadvantage of polyglycol ether non-ionic surface active agents that in general they are oily liquids at atmospheric temperatures and thus, in relation to many anionic and cationic surface active agents, are at a disadvantage in respect of facility of storage, distribution and, where small amounts are required, in common usage.

It has been disclosed that urea reacts with certain organic compounds to form clathrate addition products, the formation and subsequent decomposition of these products constituting a method of separation of organic compounds which react in this manner from those organic compounds which do not.

Furthermore, it has been disclosed in the prior art that polyglycol ethers, being products of the condensation of 8–30 mols. of ethylene oxide with 1 mol. of organic hydroxy compounds of specified type, may be reacted with urea to form "pasty to pulverulent" products. This is achieved by stirring together the components without taking special steps to render them finely dispersed or atomised, the product, if further treatment is required, being subsequently milled. The process described consists in the mixing of the reactants alone. Since the product obtained by the use of an excess of urea is a solid and since by the use of many of these polyglycol ethers the reaction takes place rapidly it is not possible in these cases to obtain a requisite degree of intimacy of admixture before the mass solidifies. To attempt to homogenize the resulting product by milling would appear to be a relatively expensive operation. If it is desired to obtain the product as a free flowing powder it would be necessary to continue milling until the reaction is complete, or, in the alternative, to disintegrate the caked product which would, otherwise, normally be produced.

A further process has been described hitherto in which difficultly volatile non-pulverizable synthetic textile assisting agents, exemplified by polyglycol ethers, are added in finely divided state to fine powders, exemplified by urea, and subjected to intense mixing. Thus the above components may be mixed by separately dissolving them in water and passing them together through a spray nozzle into an atmosphere of hot air in which the product is converted to a powder.

It is an object of the present invention to provide an economically attractive method for the conversion of liquid polyglycol ether non-ionic surface active agents to solid form and whereby the products are readily obtained in powder form.

This object is accomplished by a process which comprises mixing a liquid non-ionic surface agent with an excess by weight of solid urea in the presence of a reaction diluent and a reaction activator, maintaining the mixture until urea adduct formation has taken place, filtering or centrifuging to separate the solid product and utilising the recovered liquid phase for the treatment of further quantities of agent and urea, wherein said mixing takes place in a mixing zone and the maintenance of the mixture under reaction conditions takes place in a plurality of reaction zones separately fed with mixed reactants from said mixing zone, said reaction zones being supplied in a cyclic sequence from said mixing zone, at least part of the contents of each zone, in turn, after the required reaction period, being passed to a filtration or centrifuging zone for the separation of solid product from the liquid phase, said liquid phase being recycled, at least in part, as reaction diluent.

Suitable reactor diluents are hydrocarbons or hydrocarbon mixtures in which the reactants and product are substantially insoluble and which do not, themselves, form adducts with urea under the reaction conditions. Preferably the diluent is a hydrocarbon containing five or six carbon atoms/molecule. Suitable diluents are, for example, n-pentane, iso-pentane, n-hexane, iso-hexane, cyclopentane, cyclohexane, and petroleum ether fractions boiling in the range 40–150° C. which contain only a small proportion of hydrocarbons which react with urea or which are free of said hydrocarbons.

In general, the reaction activators have some solvent action on urea. Suitable reaction activators include water; low molecular weight alcohols, for example, methanol, ethanol and glycerol; and ketones for example, acetone and methyl ethyl ketone.

Preferably the activator constitutes up to 20% by volume, based on the volume of reaction diluent employed. More particularly the proportion of activator constitutes 1%–5% by volume, based on the volume of reaction diluent. Throughout this specification the mixture of diluent and activator is referred to as "diluent mixture."

It has been found very desirable to adjust the initial pH of the reaction mixture to lie within the range 5.0–7.0. Preferably, also, the pH is maintained within this range during the reaction. Usually the pH will be adjusted by the addition of suitable free acids, for example sulphuric, phosphoric, formic, acetic, oxalic and aromatic sulphonic acids. Alternatively compounds having an acidic reaction, such as acid salts may be employed.

Alternatively, the liquid non-ionic surface active agent may be pretreated by contacting the agent with gaseous sulphur dioxide. Preferably sulphur dioxide is bubbled through the liquid non-ionic surface active agent until the agent is saturated with the gas.

According to one manner of operation, the mixed reactants are fed as a slurry in turn to each of a plurality of reaction vessels. During the period required to charge a reaction vessel, the slurry already charged decreases in volume with separation of a supernatant layer of diluent. The charging of each reaction vessel is continued until the slurry layer constitutes approximately 90% of the available volume of the vessel. Diluent in excess of the amount required to complete the charge is displaced from the top of the vessel to storage. The vessels will not usually require stirring unless the rate of setting of the slurry is such as to block lower lines to the vessels. If stirring is provided, it should be operated at low speed, for example by the use of gate type stirrers.

Preferably the reaction zones are of the same size, each being large in relation to the size of the mixing zone. The relative sizes are preferably chosen to maintain the mixing zone in substantially continuous operation. The relative sizes thus depend on the time required to produce a dry powder from the detergent used and the number of reaction zones in the cycle. In general it has been found convenient to employ from 2 to 8 separate reaction zones. By way of example, for a 60 hour reaction period when using 6 reaction zones, the reaction zone should be such that it requires 12 hours continuous working of the mixer to fill one reaction zone to the preferred level.

Preferably the filtration of the batch of reaction product in each reaction zone is carried out by withdrawing slurry from a low level in each reaction zone until the level of the supernatant diluent layer is reached. At this stage a new charge of mixed reactants is added in the normal course of cyclical operation.

Preferably the mixing zone contains a powerful stirrer, for example, of propeller blade type.

If desired, there may be provided a distillation stage, fed by a slip stream of reaction diluent, wherein a high boiling fraction is removed, the fraction comprising, for example, components of the liquid non-ionic surface active agent which do not form adducts, or which only form adducts at an undesirably low rate.

Preferred non-ionic surface active agents contain a chain of condensed ethylene oxide units. Examples are:

(a) Products from fatty and resin acids comprising compounds of the general type

R—COO—(CH₂CH₂O)ₙCH₂CH₂—OH where R is a long chain alkyl group, preferably having 5–50 carbon atoms and n is an integer, preferably in the range 5–50.

Commercial examples of the foregoing are the reaction product of 1 mol. of "70% resin fatty acids" and 10 mol. of ethylene oxide manufactured by Armour Corporation and sold under the trade name "Ethofat 242/20"; the reaction product of 1 mol. of "70 resin fatty acids" with 15 mol. of ethylene oxide manufactured by Armour Corporation and sold under the trade name "Ethofat 242/25"; a stearyl polyglycoether having chains of ethylene oxide groups on the average of 6 units in length and sold under the trade name "Soromin SG"; and the reaction product of tall oil with ethylene oxide manufactured by the Atlas Powder Company and sold under the trade name "Renex."

(b) Products from alcohols, comprising compounds of the general type

(R—O—CH₂—CH₂—O)ₙ—CH₂—CH₂—OH where R is a long chain alkyl group preferably having 5–50 carbon atoms and n is an integer preferably in the range 5–50.

Commercial examples of these compounds are the products:

"Aeto PO6" which is an alcoholic material of average chain length 15 and a hydroxyl number of 247 condensed with 12 mol. of ethylene oxide.

"Aeto PC12" which is an alcoholic material of average chain length 15 and a hydroxyl number of 247 condensed with 12 mol. of ethylene oxide.

(c) Products from alkylated phenols comprising compounds of the general type

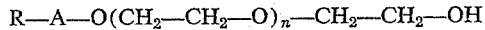
R—A—O(CH₂—CH₂—O)ₙ—CH₂—CH₂—OH where R is a long chain alkyl group preferably of 8–12 carbon atoms, A is an aromatic group and n is an integer, preferably in the range 5–50.

Commercial examples of the foregoing are the products:

"Lissapol N," which in the above formula R is an alkyl group having an average of 8 carbon atoms, A is a benzene ring and n is approximately 12; a condensate of 1 mol. of dodecyl phenol and 12 mol of ethylene oxide sold under the trade name "Igepal C extra conc." and a product similar to "Igepal C extra conc." sold under the trade name "Antarox A 200."

(d) Products from mercaptans of the general type

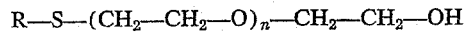
R—S—(CH₂—CH₂—O)ₙ—CH₂—CH₂—OH where R is a long chain alkyl group preferably of 10–14 carbon atoms and n is an integer, preferably in the range 5–50.

A commercial example is the American product "Nonic 218" made by Sharples Chemicals Inc., and which is a condensate of ethylene oxide with tertiary dodecyl mercaptan.

Usually the liquid non-ionic surface active agent is reacted with urea in a ratio up to 1:5 and preferably up to 1:2 by weight.

Although water may be present in the mixture of non-ionic surface active agent and urea undergoing reaction, it is in general not desirable that it should be present in excess of 25% by weight of the surface active agent employed.

In general it will be found convenient to carry out the reaction of non-ionic surface active agent and urea compound at a temperature within the range 0–80° C. Preferably the temperature is maintained within the range 15–45° C.

Figure 2:
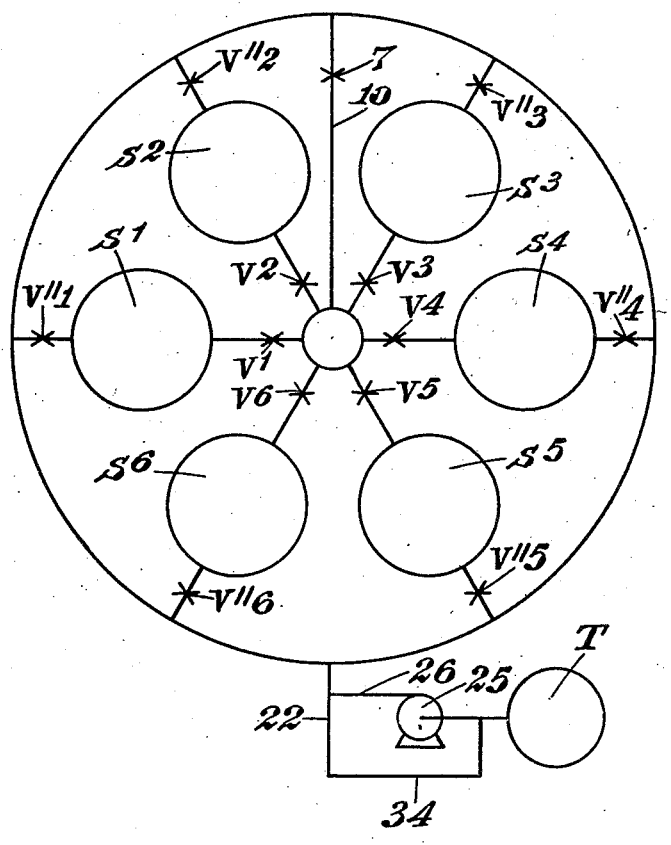

The invention is illustrated but in no way limited with reference to the Figures 1 and 2 accompanying the specification and which are flow diagrams of the process herein described.

With reference to Figures 1 and 2: Liquid non-ionic detergent is fed from line 1 to vessel 2 wherein it is treated with sulphur dioxide or a mineral acid or organic acid, and then passes by line 4 to intermediate storage vessel 5.

Treated detergent from vessel 5 is passed by line 6 to mixer M in which it is stirred with ground urea, introduced from hopper 8 by line 9, and diluent, introduced by line 10. The mixer M is constantly stirred by means of propeller stirrer 11. Mixing is effected by first suspending the detergent in the diluent and then adding urea in small lots over a period of 15 minutes in an amount equal to twice the weight of the detergent. The total amount of feed is adjusted to give a 2:1 ratio by weight of diluent to total urea and detergent.

The stirred contents of the mixer M and successive charges therefrom are passed by line L1 and valve V1 into vessel S1.

Some settling of the slurry takes place during charging with separation of a supernatant layer of diluent mixture. Charging of the vessel is continued after the upper level of the diluent layer has reached line V"1, excess diluent thereafter being removed thereby via ring main R to storage in tank T. When the slurry layer occupies approximately 90% of the available volume of vessel S1 subsequent charges from mixer M are discharged to vessels S2, S3, S4, S5 and S6 in order.

The time cycle is arranged to permit the filling of vessels S2, S3, S4 and S5 during the required reaction time, for example, 48 hours. Thus when vessel S5 has been filled, the slurry layer of S1 is passed by line L'1, valve V'1 and line 15 to the closed rotary filter F, damp powder being passed by line 16 to rotary air drier D where residual solvent is removed at a temperature not exceeding 40° C., and the product discharged by conduit 21.

Vapors from drier D are passed by line 17 to condenser 18. Condensate is passed by line 19, and is blended with filtrate passing by line 20 from filter F for storage in diluent reservoir T.

Slow adducting oil is bled off from the diluent mixture, continuously or batchwise, by passing diluent mixture by line 24, pump 25, line 26 and valve 27, to flash vaporizing unit 28, the rejected oil being withdrawn by line 29 and overhead vapor passed by line 30 to condenser 31. Condensed diluent is returned to the reservoir T by line 32 and uncondensed gases withdrawn by line 23.

Diluent mixture required for use in mixer M passes by lines 26, 22 and 35, valve 36 and line 37 to ring main R.

In continuous operation, one vessel, as exemplified above, S1, initially contains some diluent, the other vessels S2, S3, S4, S5 and S6 being charged with reaction mixture and diluent. Towards the completion of charging, some diluent in S1 is displaced by charges from mixer M and passing via valve V'1, ring main R, lines 37, valve 36, line 35, valve 34 and line 33 to reservoir T. After charging, the vessel S1 thus contains an upper layer diluent and a lower layer of reaction mixture.

Concurrently with the charging of vessel S1 with reactants from M, the slurry layer in vessel S2 is discharged to filter F and at the end of the stage (S1 then being fully charged), vessel S2 contains only the diluent mixture layer.

In the second stage, vessel S2 is progressively charged with reaction mixture from mixer M, diluent being displaced from the top of vessel S2 to reservoir T. During this stage, the lower layer in vessel S3 is discharged to filter F and at the end of the stage, vessel S3 contains only the diluent mixture layer.

In subsequent stages, vessels S3, S4, S5 and S6 are charged and the contents of the vessels S4, S5, S6 and S1 are filtered, thereby completing the cycle.

We claim:

1. A process for the production of solid non-ionic surface active agents, which comprises mixing a liquid non-ionic surface active agent, containing, in the molecule, a chain of condensed ethylene oxide groups with an excess of solid urea in the presence of a reaction diluent and a reaction activator, maintaining the mixture until urea adduct formation has taken place, separating the solid product and utilising the recovered liquid phase for the treatment of further quantities of agent and urea, wherein said mixing takes place in a mixing zone and the maintenance of the mixture under reaction conditions takes place in a plurality of reaction zones separately fed with mixed reactants from said mixing zone, said reaction zones being supplied in a cyclic sequence from said mixing zone, at least part of the contents of each zone, in turn, after the required reaction period, being passed to a zone in which it is subjected to a separating operation for the separation of solid product from the liquid phase, said liquid phase being recycled, at least in part, as reaction diluent.

2. A process as specified in claim 1 in which there is employed from 2 to 8 reaction zones.

3. A process as specified in claim 1 in which there is employed six reaction zones of equal size.

4. A process as specified in claim 1 in which the reaction diluent is a hydrocarbon having 5 or 6 carbon atoms in the molecule and which does not form an adduct with urea.

5. A process as specified in claim 1 in which the reaction diluent is a petroleum ether fraction boiling in the range 40–150° C. said diluent being substantially free of hydrocarbons which react with urea.

6. A process as specified in claim 1 in which the reaction activator is a hydroxy-compound selected from the group consisting of alcohols having 1–3 carbon atoms/molecule and water and mixtures of at least two of these compounds.

7. A process as specified in claim 6 in which in the mixing zone, the reaction activator constitutes up to 20% by volume of the reaction diluent present.

8. A process as specified in claim 1 in which, in the mixing zone, the liquid non-ionic surface active agent is mixed with urea in a ratio up to 1:5 parts by weight.

9. A process as specified in claim 8 in which the agent is mixed with urea in a ratio up to 1:2 parts by weight.

10. A process for the production of solid non-ionic surface active agents, which comprises mixing a liquid non-ionic surface active agent containing, in the molecule, a chain of condensed ethylene oxide groups with an excess of solid urea in the presence of a reaction diluent and a reaction activator, maintaining the mixture until urea adduct formation has taken place, separating the solid product and utilizing the recovered liquid phase for the treatment of further quantities of agent and urea, wherein said mixing takes place in a mixing zone and the maintenance of the mixture under reaction conditions takes place in a plurality of reaction zones separately fed with mixed reactants from said mixing zone, said reaction zones being supplied in a cyclic sequence from said mixing zone, at least part of the contents of each zone, in turn, after the required reaction period, being passed to a zone in which it is subjected to a separation operation for the separation of solid product from the liquid phase, said liquid phase being recycled, at least in part, as reaction diluent and wherein part of the reaction diluent is withdrawn from the cycle comprising the mixing stage, reaction stage and filtration or centrifuging stage and is passed to a distillation stage with recovery of an overhead product and a high boiling fraction and wherein the overhead product is returned to said cycle.

References Cited in the file of this patent

UNITED STATES PATENTS

| | | |
|---|---|---|
| 2,078,247 | Houdry | Apr. 27, 1937 |
| 2,223,162 | Benedict | Nov. 26, 1940 |
| 2,499,820 | Fetterly | Mar. 7, 1950 |
| 2,560,193 | Shoemaker | July 10, 1951 |
| 2,588,602 | Adams et al. | Mar. 11, 1952 |
| 2,665,256 | Barker | Jan. 5, 1954 |
| 2,673,195 | Busso et al. | Mar. 23, 1954 |
| 2,681,335 | Gorin | June 15, 1954 |
| 2,700,664 | Weedman et al. | Jan. 25, 1955 |
| 2,716,113 | Axe | Aug. 23, 1955 |
| 2,723,220 | Axe | Nov. 8, 1955 |

FOREIGN PATENTS

| | | |
|---|---|---|
| 974,704 | France | Oct. 4, 1950 |